United States Patent
Kwatra et al.

(10) Patent No.: US 11,483,262 B2
(45) Date of Patent: Oct. 25, 2022

(54) CONTEXTUALLY-AWARE PERSONALIZED CHATBOT

(71) Applicant: International Business Machines Corporation, Armonk, NY (US)

(72) Inventors: Shikhar Kwatra, San Jose, CA (US); Victor Povar, Vancouver (CA); Indervir Singh Banipal, Austin, TX (US); Craig M. Trim, Ventura, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/095,804

(22) Filed: Nov. 12, 2020

(65) Prior Publication Data
US 2022/0150189 A1    May 12, 2022

(51) Int. Cl.
*H04L 51/02* (2022.01)
*G06V 40/20* (2022.01)
*H04L 67/306* (2022.01)
*G06V 40/16* (2022.01)

(52) U.S. Cl.
CPC ............ *H04L 51/02* (2013.01); *G06V 40/176* (2022.01); *G06V 40/20* (2022.01); *H04L 67/306* (2013.01)

(58) Field of Classification Search
CPC ... H04L 51/02; H04L 67/306; G06K 9/00315; G06K 9/00335
See application file for complete search history.

(56) References Cited

U.S. PATENT DOCUMENTS

| | | | |
|---|---|---|---|
| 6,757,362 B1 | 9/2004 | Cooper et al. | |
| 7,539,656 B2 | 5/2009 | Fratkina et al. | |
| 8,577,422 B1* | 11/2013 | Ledet ............... | G06F 3/011 |
| | | | 455/566 |
| 10,554,590 B2 | 2/2020 | Cabrera-Cordon et al. | |
| 2001/0049688 A1 | 12/2001 | Fratkina et al. | |

(Continued)

FOREIGN PATENT DOCUMENTS

| KR | 20180004725 A | 1/2018 |
|---|---|---|
| WO | 2009043020 A3 | 4/2009 |

OTHER PUBLICATIONS

Mell et al., "The NIST Definition of Cloud Computing", U.S. Department of Commerce, NIST Special Publication 800-145, Sep. 2011, 7 pages.

*Primary Examiner* — Soe Hlaing
(74) *Attorney, Agent, or Firm* — Cantor Colburn; Erik Johnson

(57) ABSTRACT

Provided are embodiments of the present invention are directed to a computer-implemented method, computer-program product, and a system for implementing a contextually-aware chatbot. Embodiments can include receiving a communication between a user and an interacting party, identifying the user of the communication by a user identifier and the interacting party of the communication by an interacting party identifier, and receiving presence information of the user during the communication. Embodiments can also include obtaining a user profile using the user identifier and the interacting party identifier based on the presence information and executing an action on behalf of the user based on the user profile when the presence information indicates the user is away from a user device used for the communication.

17 Claims, 10 Drawing Sheets

(56) References Cited

U.S. PATENT DOCUMENTS

| | | |
|---|---|---|
| 2006/0215824 A1 | 9/2006 | Mitby et al. |
| 2008/0096533 A1 | 4/2008 | Manfredi et al. |
| 2010/0250196 A1 | 9/2010 | Lawler et al. |
| 2011/0153312 A1 | 6/2011 | Roberts |
| 2011/0258276 A1* | 10/2011 | Robins .................... H04L 67/24 |
| | | 709/206 |
| 2014/0156659 A1 | 6/2014 | Grokop et al. |
| 2018/0004725 A1 | 1/2018 | Boland et al. |
| 2018/0077088 A1* | 3/2018 | Cabrera-Cordon .... G06N 3/006 |
| 2019/0104092 A1* | 4/2019 | Koohmarey ....... G06Q 30/0641 |
| 2021/0250310 A1* | 8/2021 | Kobayashi .............. H04L 51/02 |

* cited by examiner

CONTEXTUALLY-AWARE PERSONALIZED CHATBOT

BACKGROUND

The present invention relates to network communications, and more specifically, to a contextually-aware personalized chatbot.

Chatbots are computer programs that can simulate a conversation with users in various scenarios. Many systems implement chatbots to assist customer service agents or other representatives. The chatbots can be used to obtain information from a caller to direct the caller to the appropriate department. By directing the call to the correct destination, rerouting of calls can be avoided and the delay in handling the caller's concern can be reduced. Also, chatbots are often used on retail websites to assist the user with any questions that may need to be addressed.

SUMMARY

Embodiments of the present invention are directed to a computer-implemented method for implementing a contextually-aware chatbot. A non-limiting example of the computer-implemented method includes receiving, by a processor, a communication between a user and an interacting party; identifying the user of the communication by a user identifier and the interacting party of the communication by an interacting party identifier; and receiving presence information of the user during the communication. The computer-implemented method also includes obtaining a user profile using the user identifier and the interacting party identifier based on the presence information and executing an action on behalf of the user based on the user profile when the presence information indicates the user is away from a user device used for the communication.

Embodiments of the present invention are directed to a system for operating a contextually-aware chatbot. A non-limiting example of the system includes a processor, a memory, and a cognitive module. The cognitive module can be configured to receive a communication between a user and an interacting party; identify user of the communication by a user identifier and the interacting party of the communication by an interacting party identifier; and receive presence information of the user during the communication. The cognitive module can also include obtain a user profile using the user identifier and the interacting party identifier based on the presence information; and execute an action on behalf of the user based on the user profile when the presence information indicates the user is away from a user device used for the communication.

Embodiments of the invention are directed to a computer program product for a contextually-aware chatbot, the computer program product comprising a computer readable storage medium having program instructions embodied therewith. The program instructions are executable by a processor to cause the processor to perform a method. A non-limiting example of the method includes receiving a communication between a user and an interacting party; identifying the user of the communication by a user identifier and the interacting party of the communication by an interacting party identifier; and receiving presence information of the user during the communication. The method also includes obtaining a user profile using the user identifier and the interacting party identifier based on the presence information and executing an action on behalf of the user based on the user profile when the presence information indicates the user is away from a user device used for the communication. The method includes presenting a transcript of the communication that took place during absence of the user responsive to the presence information indicating the user has returned to the user device used for communication; and allowing the user to continue the communication.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
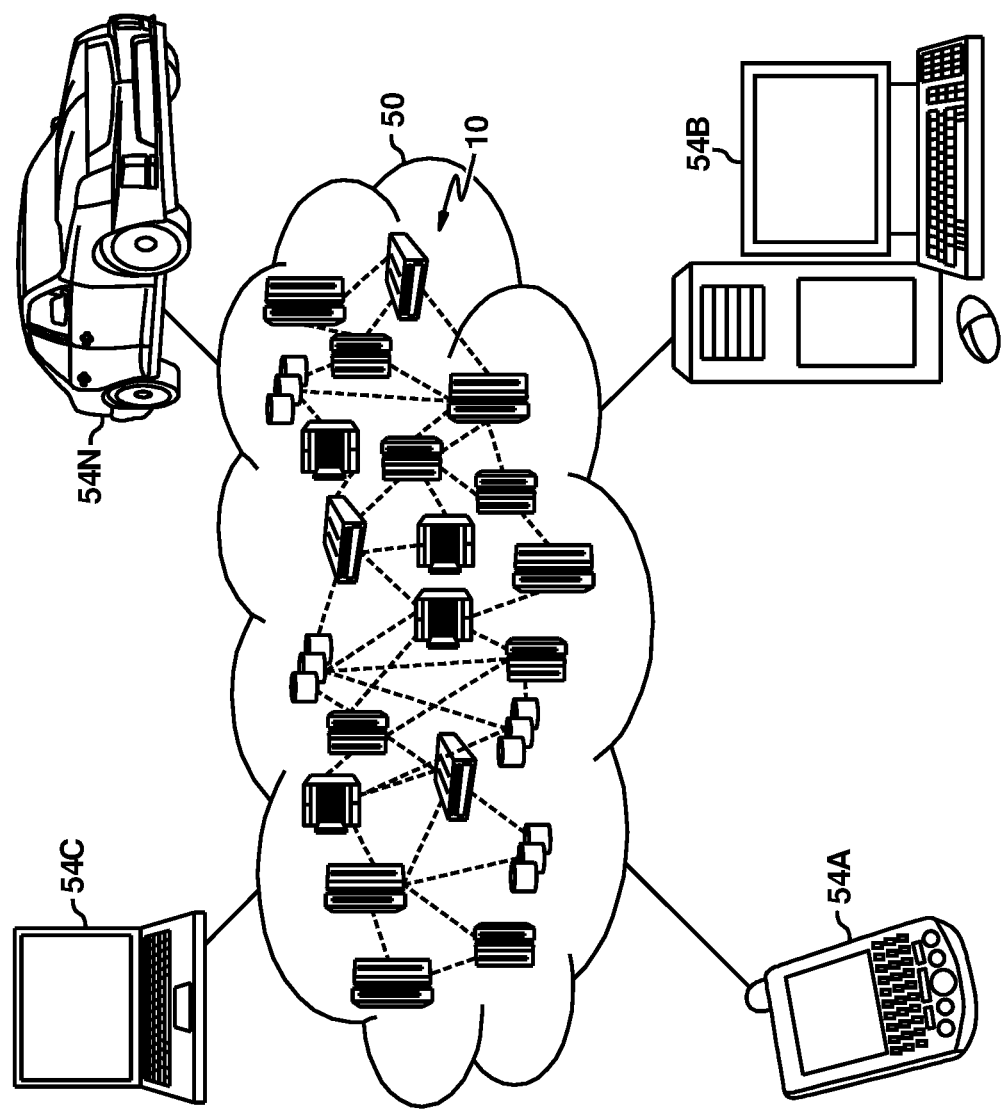
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
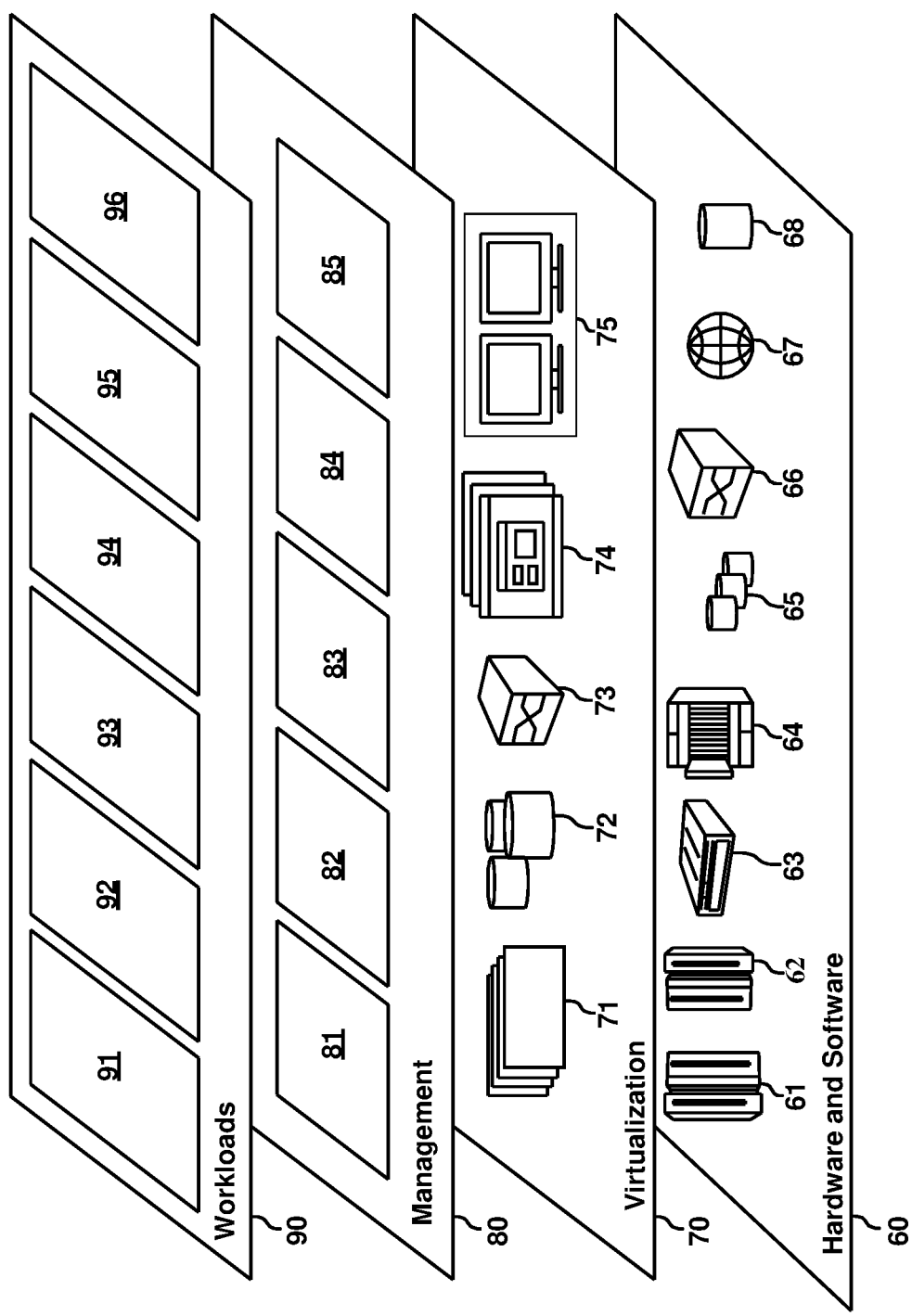
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive system 96.

An illustrative method in accordance with example embodiments of the invention and corresponding data structures associated therewith will now be described. It should be noted that each operation of the methods 900, 1000 may be performed by one or more of the program modules or the like depicted in FIG. 4, whose operation will be described in more detail hereinafter. These program modules may be implemented in any combination of hardware, software and/or firmware. In certain example embodiments, one or more of these program modules may be implemented at least in part in any combination of hardware, software and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 3:
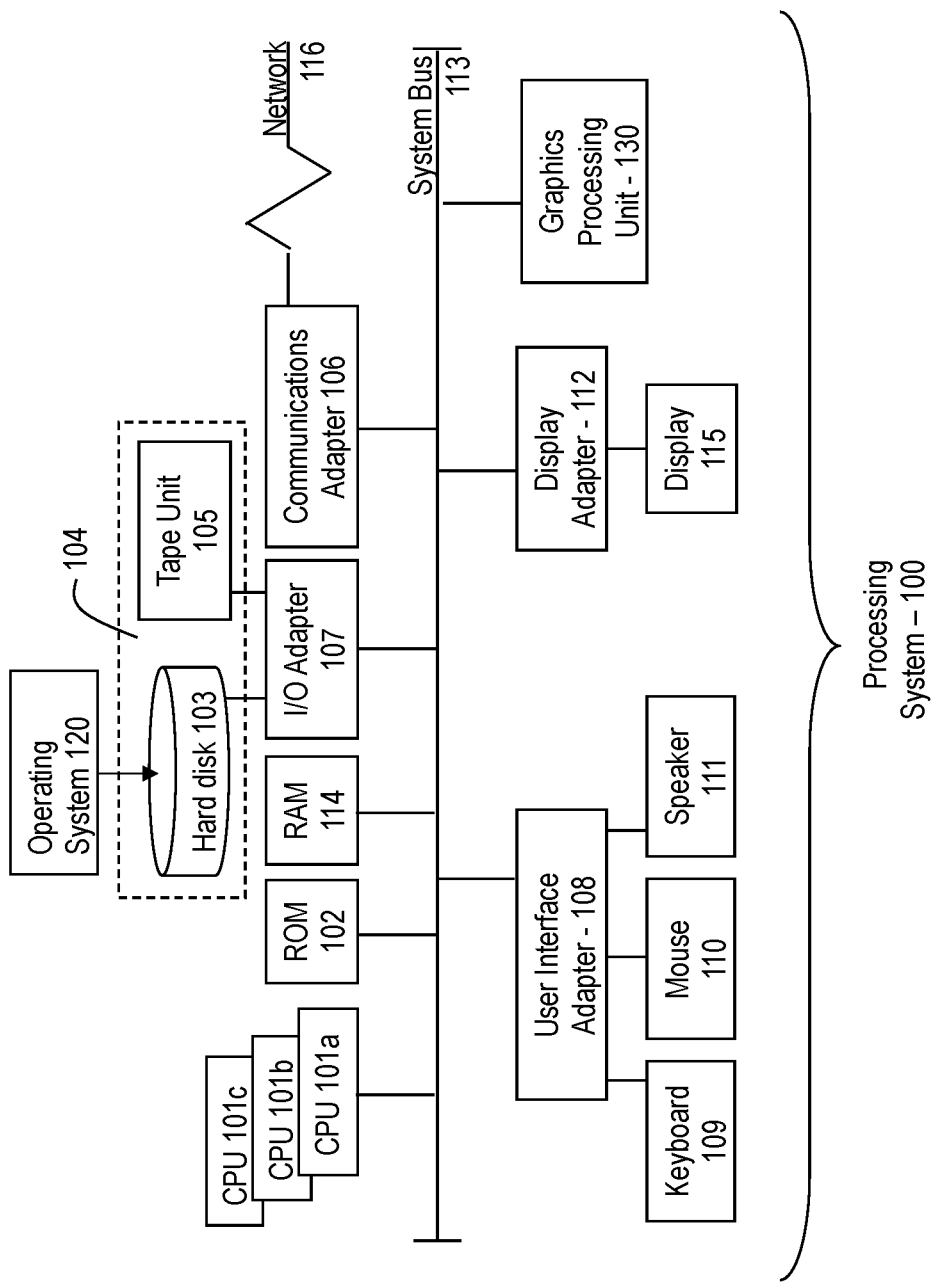
FIG. 3 depicts a processing system for implementing one or more embodiments of the present invention.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor)

115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Turning now to an overview of technologies that are more specifically relevant to aspects of the invention, in today's environment, the world is highly interconnected and moves at a breakneck pace. People are increasingly traveling more considerable distances spread across the entire globe. Whether it is a project team with collaborators on different continents and time zones or extended family members who have drifted to different parts of the world or merely a member of a family on a business or personal trip, no matter the distances and time zones that separate us, there is an increased need for continuous communication and responsiveness. At the same time, it essential to allow for exercise, family, time away, and other events Chatbots provided in the prior art fail to consider the specific relationships between the users and the interacting parties and provides different answers based on the relationship between a first user and a second user. Chatbots of the prior art are limited to provided generic conversation with the interacting parties. There is a need for continuous communication and responsiveness whether in business or in personal lives. At the same time, it is essential to allow users time to step away for personal and unrelated events.

Turning now to an overview of the aspects of the invention, one or more embodiments of the invention address the above-described shortcomings of the prior art by providing a cognitive module that is embedded into a communication system, such as an instant messenger, phone application, email client, etc. where the cognitive module is configured to monitor incoming and outgoing communication between a user and an interactive party. The cognitive module can leverage historical information from the communications of a user to learn how the user interacts with different parties and also to learn how the user responds in various situations. Furthermore, the cognitive module uses the historical information to train the cognitive module and learn about the user's behavioral patterns and personality. Responsive to identifying when the user has stepped away the cognitive system can respond to new communications from the interacting parties.

The cognitive system can adapt itself to the behavior and personality of the user, such that if the cognitive system takes over temporally, the interacting party should not be able to detect the difference. For this type of personalized adaptation, the cognitive system is trained on the personalized user data and maintains the classifier for the particular user on its local/private cloud.

By maintaining the user profile for the user with each interacting party, the cognitive module/system is allowed to act on behalf of the user to maintain a seamless interaction from the perspective of the interacting party when the user has stepped away.

The above-described aspects of the invention address the shortcomings of the prior art by providing techniques to generate a user profile based on the relationship the user has with an interacting party, determine when the user has stepped away, and interact with the interacting party on behalf of the user while the user is away using the generated user profile.

Figure 4:
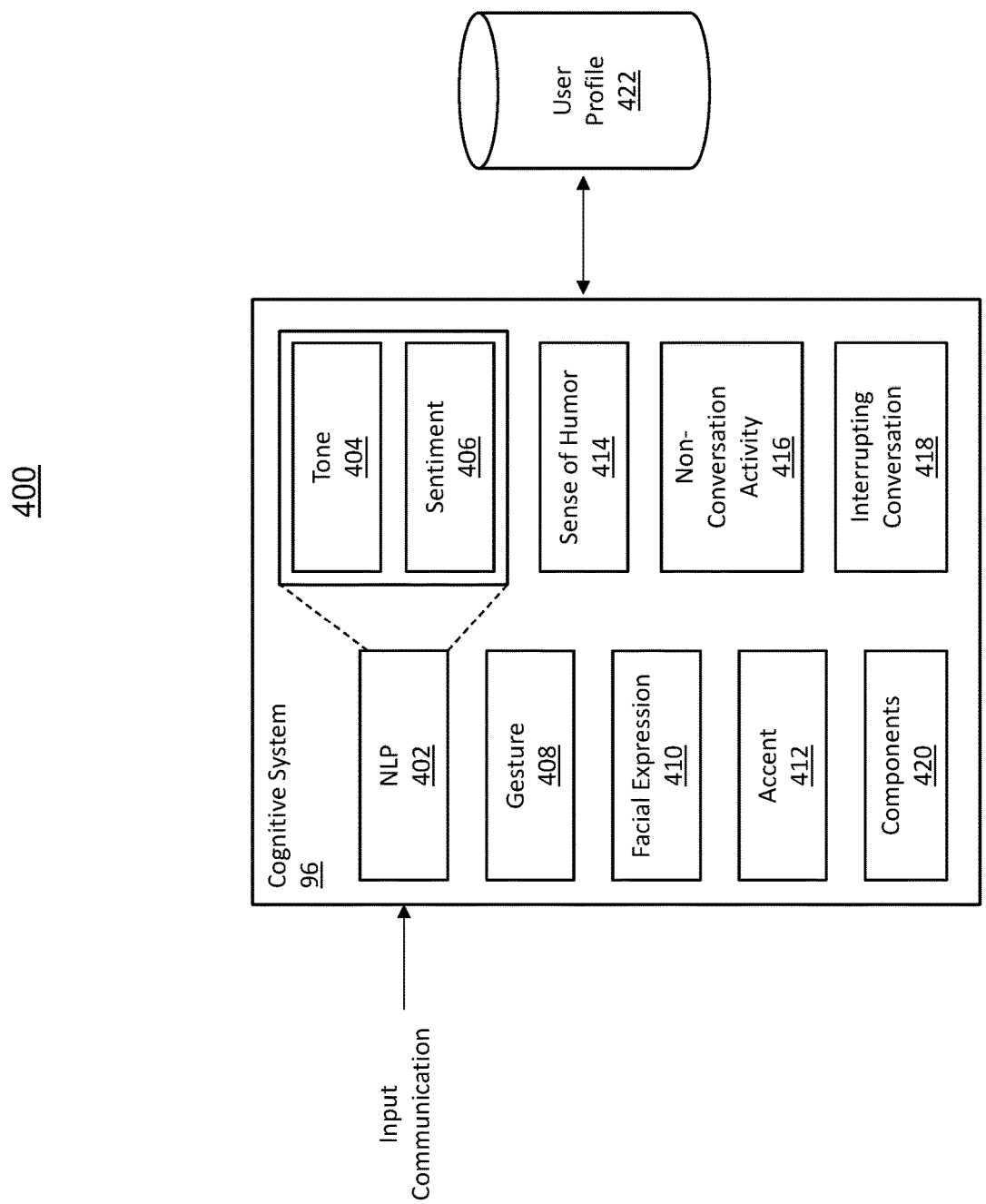
FIG. 4 depicts an architecture of the cognitive system in accordance with one or more embodiments of the invention.

Turning now to a more detailed description of aspects of the present invention, FIG. 4 is a schematic diagram of an illustrative architecture 400 configured to implement one or more example embodiments of the disclosure. The architecture 400 may include one or more processors configured to execute the cognitive system 96.

In one or more embodiments of the invention, the cognitive system 96 includes various modules and components to execute the techniques described herein.

The cognitive system 96 can include a natural language processor (NLP) 402 to analyze the communication between the user and the interacting party. The NLP 402 may be provided in a user device or a computing device external to the user device used for communication. In one or more embodiments of the invention, the NLP 402 can include various modules including a tonal analysis module 404 and sentiment analysis module 406.

The training module includes an NLP application that annotates the baseline conversations to indicate a variety of features. For example, the NLP application may annotate with parts of speech, normalize and relate terms in the conversation using ontologies, identify clauses, phrases, sentences, sentence types, and other units of conversation as well structures and relationships among the units of conversation. The NLP application may also label units of conversation with topics, subjects, or concepts, measures of sentiment, measures of agreement, measures of shift in topic, etc. More generally, the NLP application may evaluate the baseline conversations to identify topics of conversation, which participants spoke each unit of conversation, emotional statements, questions asked by a participant, answers given in response to questions, and the like.

The tonal analysis module 404 may be IBM® WATSON® Tone analyzer service, for example. The tonal analysis module can use linguistic analysis to detect three types of tones from the text. The natural language content is analyzed by the tonal analysis module for determining the emotional impact, social tone, and writing style that the content projects. The tonal analysis module may provide tonal scores for emotional tone, social tone, and language tone. For emotional tone, the tonal analysis module may utilize the emotions for "joy", "fear", "sadness", "disgust" and "anger". Each natural language element is evaluated with respect to each emotion. Each emotion may be evaluated from lower values having a value range that indicates if that emotion is less likely to appear as perceived or alternatively to a higher value range if the emotion is more likely to be perceived with respect to each natural language content. Other emotions may be utilized as well as a different value score.

For social tone, the five elements of openness, conscientiousness, extraversion, agreeableness, and emotional range are utilized. Openness is evaluated as the extent a person is open to experience a variety of activities. This trait may be provided a value range indicating that it is more likely to be perceived as no-nonsense, straightforward, blunt, and obvious, alternatively, a higher value range may be provided if the content indicates that it will be perceived as intellectual, curious, emotionally-aware, or imaginative. Conscientiousness is evaluated as the tendency to act in an organized or thoughtful way. This trait may be provided a value range if the presentation is perceived as spontaneous, laid-back, reckless, unmethodical or disorganized, or alternatively, a higher value range may be provided if the content is perceived as disciplined, dutiful, or confident. Extraversion is evaluated as the tendency to seek stimulation in the company of others. This trait may be provided a value range if perceived as independent, timid, introverted, restrained, boring, or alternatively, a higher value range may be provided if the content is perceived as engaging, seeking attention, assertive, sociable. Agreeableness is evaluated as the tendency to be compassionate and cooperative towards others. This trait may be provided a value range if the presentation is perceived as selfish, uncaring, uncooperative, confrontational or arrogant, or alternatively, a higher value range may be provided if the content is perceived as caring, sympathetic, cooperative, or trustworthy. The emotional range is evaluated as the tendency to be sensitive to the environment. This trait may be provided a value range if the presentation is perceived as calm, bland, content, relaxed or alternatively a higher value range may be provided if the content is perceived as concerned, frustrated angry, passionate, upset, stressed or impulsive. These tones, descriptions, and weights are merely illustrative and additional tones, descriptions or weights may be utilized.

Language tones may be analyzed to measure the user's writing style. The various styles may include analytic, confidence and tentative. The analytic style may focus on the individual's reasoning and analytical attitude about things. The analytic style may be provided a value range if the text contains little or no evidence of analytical tone or alternatively a higher value range if the presentation is more likely to be perceived as intellectual, rational, systematic, emotionless, or impersonal. The confidence style may focus on the presenter's degree of certainty. The confidence style may be provided a value range if the text contains little or no evidence of confidence in tone or alternatively a higher value range if the style is more likely to be perceived as assured, collected, hopeful or egotistical. The tentative style may focus on the presenter's degree of inhibition. The tentative style may be provided a lower value range if the text contains little or no evidence of tentativeness in tone or a higher value range if the style is more likely to be perceived as questionable, doubtful limited, or debatable. The word stemming and summation module.

The sentiment analysis module 406 may be provided by IBM® WATSON® Alchemy Language application program interface (API) or WATSON® Natural Language Understanding API. The above-mentioned APIs are mentioned for exemplary purposes. Any cognitive AI can be utilized within the sentiment analysis module 406. The sentiment analysis module 406 can process natural language to incorporate both a linguistic and statistical analysis in evaluating the context of a communication. In text analysis, the sentiment is the attitude or opinion expressed toward something. Sentiment can be positive, "sounds good", negative, "this is bad", or neutral. Sentiment can be calculated based on keywords extracted and evaluated at a keyword level. Additionally, the sentiment analysis may be capable of identifying negations, such as the term "not" and the change in sentiment from the keyword "good" when the phrase is "not" "good". The sentiment analysis may consider intensity when the terms "very" or other adjectives are utilized in combination with a keyword. Additionally, the keywords may be weighted. For instance, a positive phrase such as "like" will have a predefined positive weight, whereas the phrase "love" might have a higher predefined positive weight. Additionally, negative weights may be afforded negative phrases such as "dislike" would have a predefined negative weight and the phrase "hate" might have a higher negative weight. The sentiment analysis module can evaluate the content to provide a sentiment level. This sentiment level may also include an intensity value.

The gesture extraction module 408 can be used to extract gestures that are commonly used by the user. The gestures can be obtained from various inputs such as a user interface such as a touchscreen, a keyboard, or from a camera.

The facial expression module 410 is configured to extract the facial expressions of the user. The facial expressions of the user can be input into the cognitive system 96 using devices such as but not limited Internet of Things (IoT) cameras. The facial expressions, such as but not limited to expressions representing happiness, sadness, excitement, and the like, can be presented on an avatar if one is associated with a chat session.

The accent extraction module 412 is configured to extract the user's accent when speaking. In one or more embodiments of the invention, the user's accent can be detected using Mel Frequency Cepstral Coefficients (MFCC). In one or more embodiments of the invention, the cognitive system 96 can determine the user's dialect, inflection, etc. and other characteristics of the user's speech.

The humor module 414 can analyze the user's sensibilities with regard to humor. The cognitive system can generate language similar to the user's sense of humor which has been detected by the NLP over a period of time.

The non-conversation activity modules 416 is configured to detect the user's non-conversation activity indicating the user's interest level in the conversation. For example, non-conversation activity can include mouse clicks on a browser or some other movement.

The conversation interruption module 418 is configured to mimic the user's behavior and personality during a conversation. The ability of the user to allow the other party to speak along with a measure of the extent to which the user speaks or is willing to listen. This can prevent the other party from monopolizing the conversation.

It should be understood that other components 420 can be incorporated into the architecture 400 to collect different information from the user to enhance the conversational flow with the interacting party during the user's absence.

The user profile 422 can store all of the above aforementioned features and more. The user profile 422 can be later obtained to control how the chatbot will respond to a particular interacting party on behalf of the user while they are away.

Figure 5:
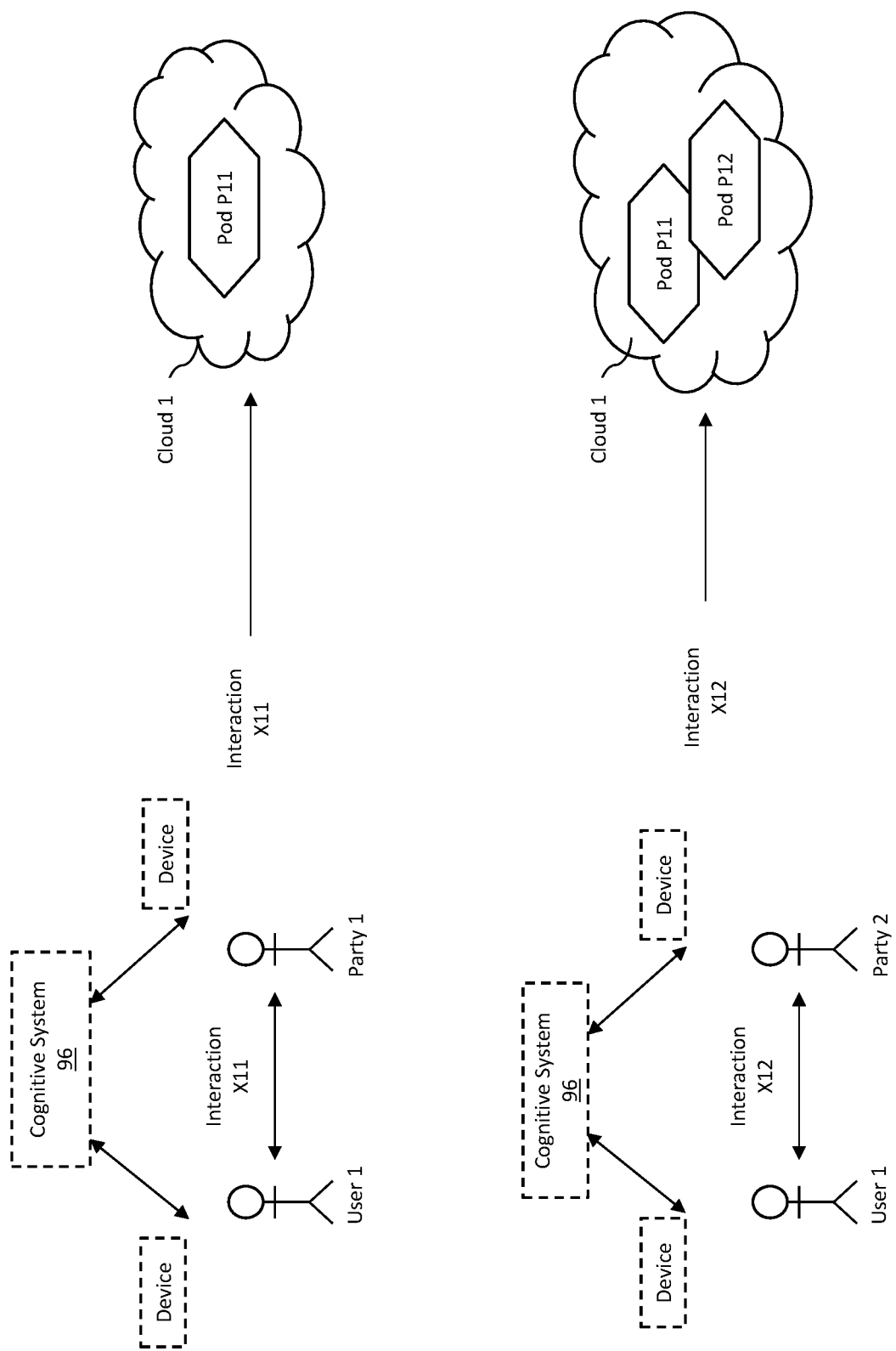
FIG. 5 depicts a diagram illustrating interactions between a user and different interacting parties using the cognitive system in accordance with one or more embodiments.

Referring now to FIG. 5, a first user (User 1) is communicating with a second user (Party 1) represented by interaction X11 over a communication network (not shown). User 1 and Party 1 may be communicating textually or verbally using a computing device such as a mobile phone or computer. It should be understood User 1 and Party 1 can use any type of computing device and is not limited to that described above. In addition, although only two users (User 1, Party 1) are shown in FIG. 5, it is not intended to limit the scope of the disclosure. The user profile representing the user's personality and behavior are stored in the cloud network (Cloud 1) in Pod P11.

Also shown in FIG. 5 is a different interaction X12 between User 1 and Party 2. The user profile representing the user's personality and behavior are stored in the cloud network in Pod P12. Because the interacting parties (Party 1, Party 2) are different, User 1 may have a different type of relationship with the Party 1 than Party 2. Therefore, the user Pods P11, P12 store user profiles that are unique to each of the relationships. The cognitive system uses the Pod for each respective to interacting party to generate a chatbot to mimic the personality and behavior of the User 1. FIG. 5 also illustrates that each of the Pods P11, P12 can be stored individually in the cloud (Cloud 1) so that the individual user profiles obtained when needed.

Figure 6:
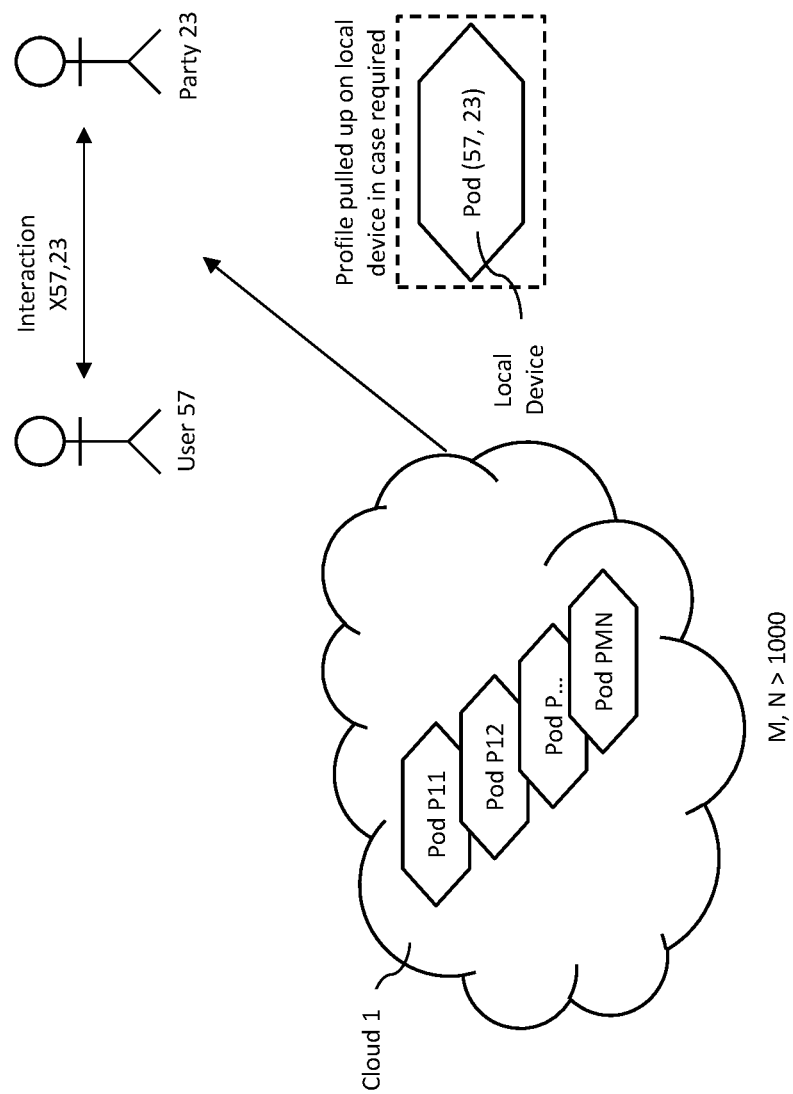
FIG. 6 depicts a diagram illustrating interactions between a user and different interacting parties using the cognitive system in accordance with one or more embodiments.

As shown in FIG. 6, the cognitive system 96 detects the interaction between a first user (User 57) and a second user (Party 23). Responsive to detecting the user identifier and the interacting party identifier, the user profiles Pod 57, Pod 23 are located in the external cloud (Cloud 1) and stored locally on the user's local device. The user profiles are not used until an indication that the user is no longer present or is unavailable to continue the conversation is received. By efficiently locating the record using the key and storing the record locally prior to the detection of the user's absence the cognitive system is able to quickly respond to a user request.

Figure 7:
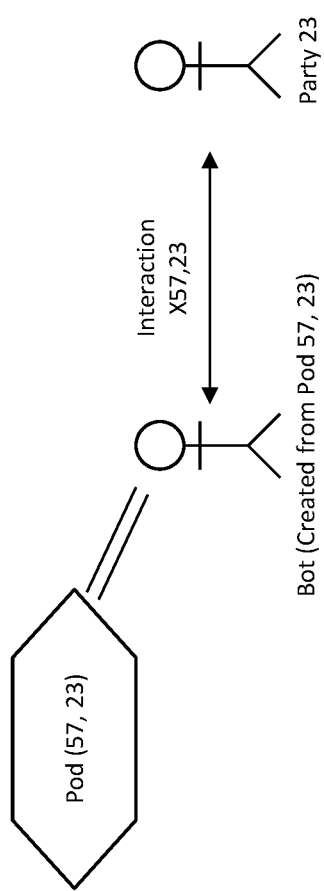
FIG. 7 depicts a diagram illustrating interactions between a user and different interacting parties using the cognitive system in accordance with one or more embodiments.

FIG. 7 illustrates the cognitive system 96 generates a bot using created using the Pod 57, Pod 23 that will be used when responding to the interacting party on behalf of the user when the user is away.

Figure 8:
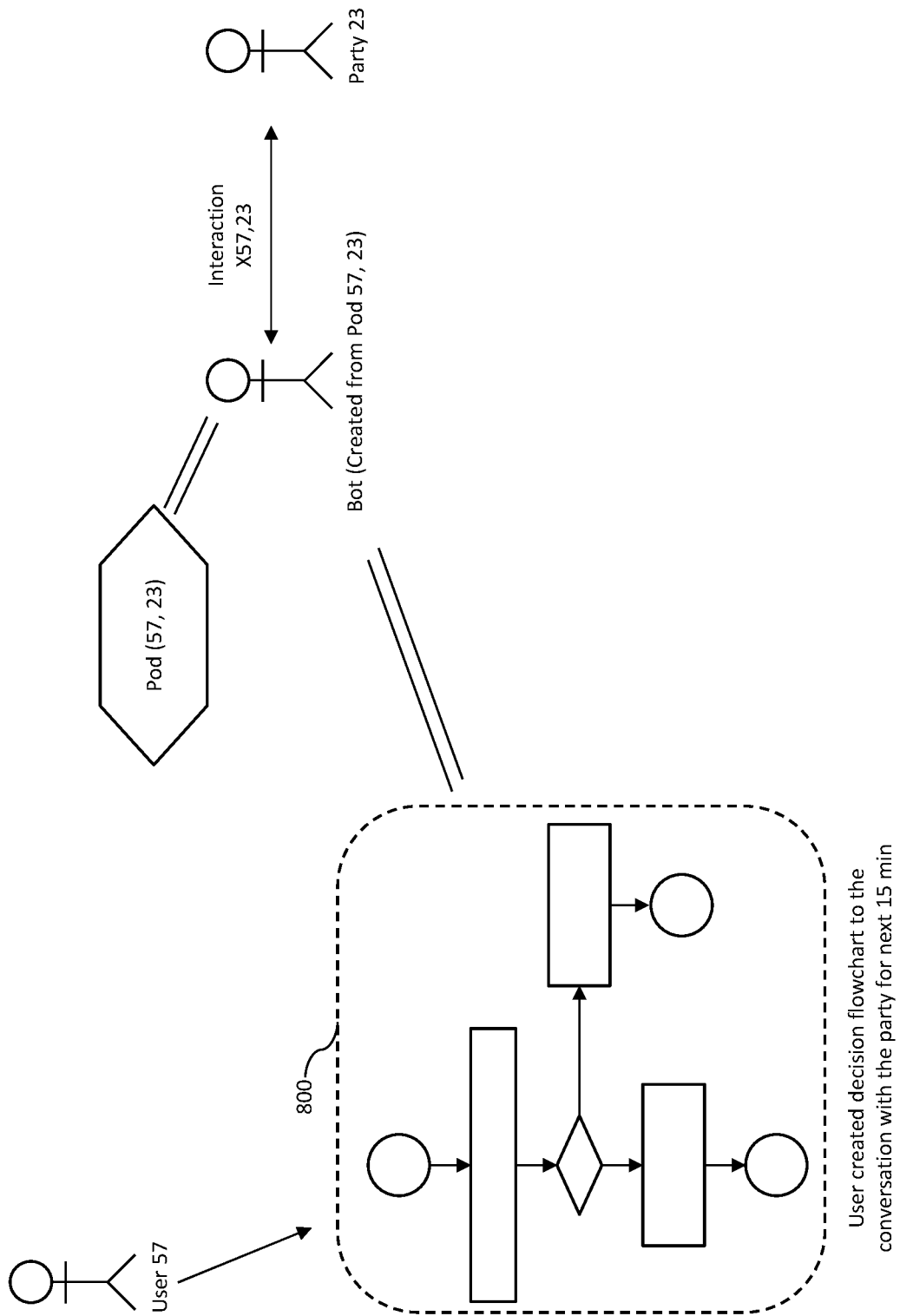
FIG. 8 depicts a diagram illustrating an interaction between a user and an interacting parties using the cognitive system where the user inputs a conversation flow in accordance with one or more embodiments.

FIG. 8 depicts a conversation flow 800 that can be input into the cognitive system 96 to execute the chatbot during the user's absence. In a non-limiting example, the User 57 may discuss travel plans with the Party 57. During the conversation the user may need to take a restroom break. However, the user does not want to lose the conversation flow. Prior to the User 57 leaving the conversation, the user inputs an "if-else" based conversation flow 800 into the cognitive system which the cognitive system 96 executes using the user profile that has been obtained from the storage. The interacting party 23 will not perceive a change in the conversation because the whole conversational experience is similar to when the user 57 is present in the conversation. In a non-limiting example, the conversation flow 800 can provide the following:

"I want to go to Miami, would you like to accompany me? If yes, let's book the hotels and flights together."
"If not, would you like to visit Denver? I can accommodate that."
"If still no, end the conversation or start a conversation about another topic."
"If agreed for Miami, then do you want to book a condo or stay in a hotel? . . . and so on."

In one or more embodiments of the invention, the cognitive system 96 is enabled to execute the conversation flow 800 that has been input and carry out the meaningful conversations in which a few of the user's tasks get completed in his/her absence using the dynamic user profile created.

Figure 9:
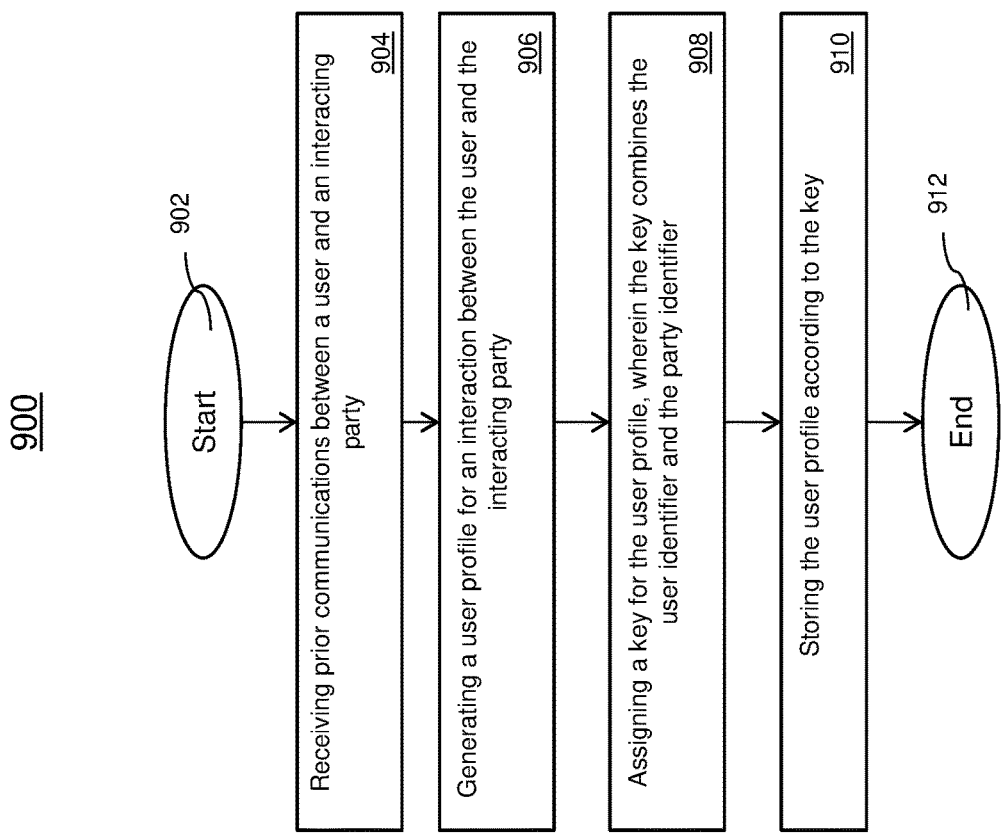
FIG. 9 depicts a flowchart of a method for generating a user profile in accordance with one or more embodiments.

FIG. 9 depicts a method 900 for operating a cognitive system. The cognitive system be incorporated in the systems shown in FIGS. 1-4 or similar. The method 900 begins at block 902 and proceeds to block 904 which provides for receiving prior communications between a user and an interacting party. In one or more embodiments of the invention, the user opts-in to the cognitive system 96 and the cognitive system 96 monitors the communication between the user and the interacting party.

The cognitive system 96 identifies the user and the interacting party during the communication. The user is associated with an identifier and the party is associated with an identifier. The user may be identified by an identifier of the user that is used for communication. The NLP 402 and other modules, such as those shown in FIG. 4, can extract various information representative of the user's personality and behavior from the communication.

Block 906, the cognitive system generates a user profile for an interaction between the user and the interacting party. The user profile can be stored in a pod. The pod stores the information representative of the user's personality and behavior when communicating with a particular interacting party. The interactions can include but of course is not limited to a user's tone, sentiment, gesture, facial expression, accent sense of humor, non-conversation activity, or conversation interruptions. It should be understood the user profile is continuously trained on the extracted data from the communication and is iteratively updated as subsequent communications occur between the user and the interacting party.

Block 908, the cognitive system assigns a key for the user profile, wherein the key combines the user identifier and the party identifier. Block 910 provides storing the user profile according to the key. The method 900 ends at block 912.

Figure 10:
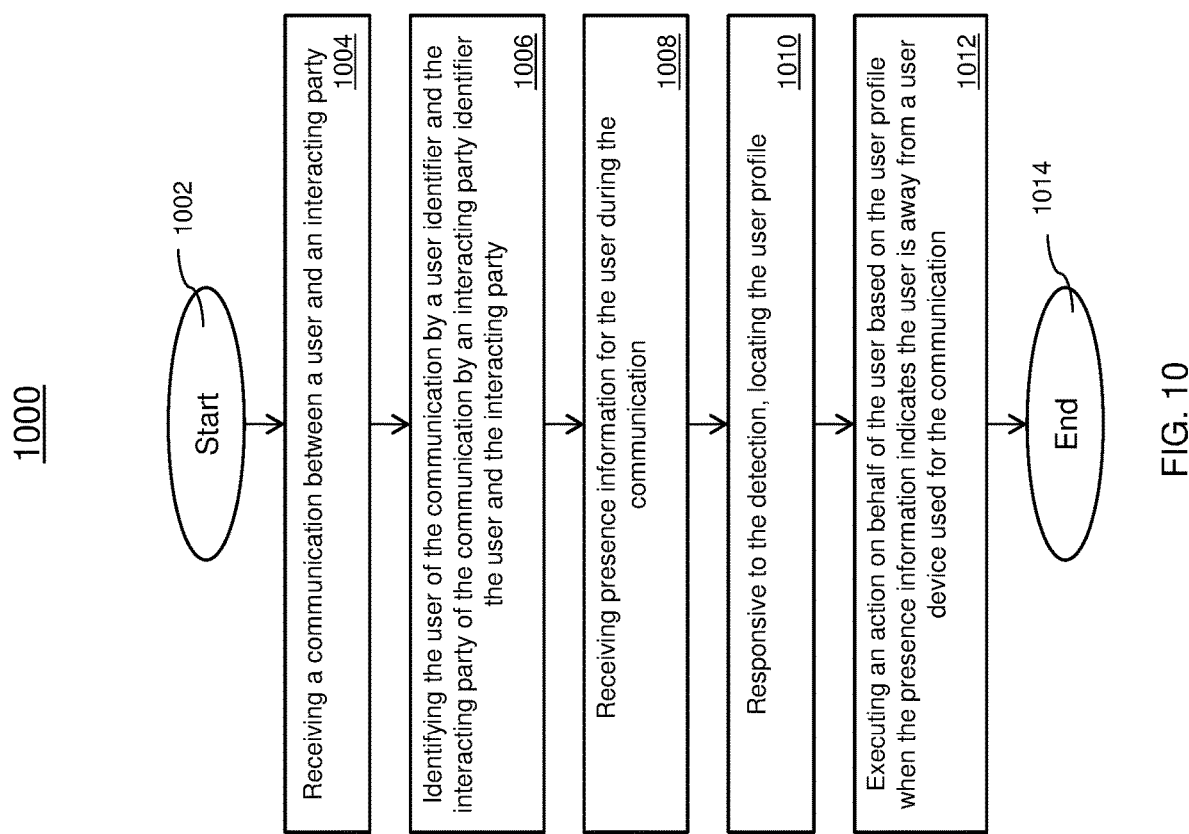
FIG. 10 depicts a flowchart of a method for operating a cognitive system in accordance with one or more embodiments.

FIG. 10 depicts a method 1000 for operating a cognitive system 96. The cognitive system 96 be incorporated in the systems shown in FIGS. 1-4 or similar. The method 1000 begins at block 1002 and proceeds to block 1004 which provides for receiving a communication between a user and an interacting party. In example embodiments of the invention, the cognitive system 96 receives a communication from a computing device of a first user and a computing device of a second user.

Block 1006 identifies, using the cognitive system 96, the user of the communication by a user identifier and the interacting party of the communication by an interacting party identifier. The user identifier and the party identifier may be associated with user credentials, device identifiers of the devices used for communication such as a MAC address, or network identifiers such as IP addresses.

Block 1008 receives, using the cognitive system 96, presence information of the user during the communication. In example embodiments of the invention, the presence information may be detected using a sensor or camera coupled to the computing device of the user. In other example embodiments of the invention, the presence information may be detected by a lack of verbal input into a microphone or data input on a user interface or keyboard. A period of time can be configured to determine that a user is no longer present or is away from the conversation. In some embodiments of the invention, if the user does not respond to the interactive party within a period of time, the system will presume and operate as if the user is away. For example, the configurable delay may be set to 3 minutes, 5 minutes, 7 minutes, or any other value suitable for the user. The period of time can be compared to a threshold period of time to allow the user to select when the system is to take over. In one example, the inactivity or unresponsiveness of the user can be determined by the system polling the input of the systems such as keystrokes.

Alternatively, in other embodiments of the invention the user can manually indicate to the cognitive system that they will be away for a period of time. It should be understood that other devices, sensors, peripherals, etc. or combinations thereof can be used to determine the presence of the user. If the user is not located, appropriate action can be taken by the system. The presence information by then be transmitted to the cognitive system which determines the presence of the user.

In one or more embodiments of the invention, if the user and the interactive party have no previous history the cognitive system 96 can respond the user is away if the user is detected to be away. Alternatively, the user may set the cognitive system to a default response such as a professional tone or behavior.

Block 1010 obtains, using the cognitive system 96, a user profile using the user identifier and the interacting party identifier based on the presence information. In example embodiments of the invention, the user profile is indexed and stored according to a key that combines the user identifier and the interacting party identifier. A look-up operation is performed for the record containing the user profile using the key which optimizes the look-up operation.

Block 1012, using the cognitive system 96, executes an action on behalf of the user based on the user profile when the presence information indicates the user is away from a user device used for the communication. The cognitive system uses the POD to control the cognitive system's exchange with the interacting party. In example embodiments of the invention, executing the action on behalf of the user can include responding to a request from the interacting party. However, in addition to simply responding to the request the response will adopt the behavior and personality of the user so the interacting party will perceive a seamless conversational flow. For example, for example an informal response may include "Great, sounds good man!" while a formal response would include "Yes, I would love to!"

In addition, the tone and sentiment of the user may be adopted in the response instead of simply provide an affirmative or negative response on behalf of the user. If an avatar is provided during the communication the avatar can adopt the facial expressions and/or gestures that are characteristic of the user that is away.

In example embodiments of the invention, if the user returns to the conversation, which can be detected by different inputs such as camera, an input on a user interface, etc., a transcript can be provided to the user so the user is able to follow the transactions during their absence. The transcript may be displayed on a display or provided to the user audibly.

The method 1000 ends at block 1014. The operations described and depicted in the illustrative methods of FIGS. 9 and 10 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 9 and 10 may be performed.

The techniques described herein improve over the prior art by enabling the system to mimic the user's behavior and personality while the user is away from the conversation. Specifically, over time the behavior and personality are learned between the user and each respective interacting party because a user may have more of professional relationship with a first interacting party and more of a social/friendly relationship with a second interacting party. Therefore, the system can intelligently maintain the behavior and personality of the user of the first interacting party and the second interacting party based on the system identifying the relationship.

The technical effects and benefits include preventing the computer system from taking up resources when the user is away. Using the techniques described herein, the computer system is able to complete the task during the user's absence and potentially free-up resources after the task has been completed. This enables the system to provision it resources and services to other tasks or processes that have been queued due to the current task.

In addition, by arranging and storing the user profiles using the key index that combines the user ID and the interacting party ID, efficient searches can be performed which can improve the operation of the computer. The computer system is not forced to search each and every record that has been stored and the desired record can be identified efficiently.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processor, a communication between a user and an interacting party;
   identifying, by the processor, the user of the communication by a user identifier and the interacting party of the communication by an interacting party identifier;
   receiving, by the processor, presence information of the user during the communication;
   obtaining, by the processor, a user profile using the user identifier and the interacting party identifier based on the presence information;
   receiving, from the user, a conversation flowchart comprising a plurality of conditional statements; and
   executing, by the processor, an action on behalf of the user based on the user profile when the presence information indicates the user is away from a user device used for the communication, the action comprising continuing the conversation with the interacting party as if the user was still present in accordance with the conversation flowchart, wherein continuing the conversation comprises responding to the interacting party in a manner that mimics a tone and a sentiment of the user specific to interactions with the interactive party, wherein the tone and the sentiment are learned by a cognitive module trained on prior conversations between the user and the interacting party.

2. The computer-implemented method of claim 1, further comprising generating a user profile for the communication comprises:
   processing prior communications to determine behavior and personality of the user with the interacting party;

assigning a key for the user profile, wherein the key combines the user identifier and the interacting party identifier; and storing the behavior and personality of the user with the key in the user profile.

3. The computer-implemented method of claim 1, wherein the user profile comprises a user's tone, sentiment, gesture, facial expression, accent sense of humor, non-conversation activity, or conversation interruptions between the user and the current interacting party.

4. The computer-implemented method of claim 1, wherein generating the user profile comprises generating a separate user profile for each different communication between the user and different interacting parties.

5. The computer-implemented method of claim 2, wherein completing the action on behalf of a user comprises providing an answer to a query and providing the personality and behavior of the user when providing the answer based on the user profile.

6. The computer-implemented method of claim 1, further comprising responsive to the presence information indicating the user has returned to the user device used for communication, presenting a transcript of the communication that took place during absence of the user; and allowing the user to continue the communication.

7. A cognitive system comprising:
a processor;
a memory;
a cognitive system configured to:
receive a communication between a user and an interacting party;
identify user of the communication by a user identifier and the interacting party of the communication by an interacting party identifier;
receive presence information of the user during the communication;
obtain a user profile using the user identifier and the interacting party identifier based on the presence information;
receive, from the user, a conversation flowchart comprising a plurality of conditional statements; and
execute an action on behalf of the user based on the user profile when the presence information indicates the user is away from a user device used for the communication, the action comprising continuing the conversation with the interacting party as if the user was still present in accordance with the conversation flowchart, wherein continuing the conversation comprises responding to the interacting party in a manner that mimics a tone and a sentiment of the user specific to interactions with the interactive party, wherein the tone and the sentiment are learned by a cognitive module trained on prior conversations between the user and the interacting party.

8. The cognitive system of claim 7, wherein generating the user profile for the communication comprises the cognitive system is configured to:
process prior communications to determine behavior and personality of the user with the interacting party;
assign a key for the user profile, wherein the key combines the user identifier and the interacting party identifier; and
store the behavior and personality of the user with the key in the user profile.

9. The cognitive system of claim 7, wherein the user profile comprises a user's tone, sentiment, gesture, facial expression, accent sense of humor, non-conversation activity, or conversation interruptions between the user and the current interacting party.

10. The cognitive system of claim 7, wherein generating the user profile comprises the cognitive system configured to generate a separate user profile for each different communication between the user and different interacting parties.

11. The cognitive system of claim 7, wherein completing the action on behalf of a user comprises the cognitive system configured to provide an answer to a query and provide a personality and behavior of the user when providing the answer based on the user profile.

12. The cognitive system of claim 7, further comprising responsive to the presence information indicating the user has returned to the user device used for communication, the cognitive system is configured to present a transcript of the communication that took place during absence of the user; and allow the user to continue the communication.

13. A computer program product for operating a cognitive system, the computer program product comprising:
a computer readable storage medium having stored thereon first program instructions executable by a processor to cause the processor to:
receive a communication between a user and an interacting party;
identify user of the communication by a user identifier and the interacting party of the communication by an interacting party identifier;
receive presence information of the user during the communication;
obtain a user profile using the user identifier and the interacting party identifier based on the presence information;
receive, from the user, a conversation flowchart comprising a plurality of conditional statements;
execute an action on behalf of the user based on the user profile when the presence information indicates the user is away from a user device used for the communication, the action comprising continuing the conversation with the interacting party as if the user was still present in accordance with the conversation flowchart, wherein continuing the conversation comprises responding to the interacting party in a manner that mimics a tone and a sentiment of the user specific to interactions with the interactive party, wherein the tone and the sentiment are learned by a cognitive module trained on prior conversations between the user and the interacting party;
responsive to the presence information indicating the user has returned to the user device used for communication, present a transcript of the communication that took place during absence of the user; and
allow the user to continue the communication.

14. The computer program product of claim 13, wherein the instructions are further executable by a processor to cause the processor to generate the user profile for the communication comprises:
processing prior communications to determine behavior and personality of the user with the interacting party;
assigning a key for the user profile, wherein the key combines the user identifier and the interacting party identifier; and
storing the behavior and personality of the user with the key in the user profile.

15. The computer program product of claim 13, wherein the user profile comprises a user's tone, sentiment, gesture, facial expression, accent sense of humor, non-conversation activity, or conversation interruptions between the user and the current interacting party.

16. The computer program product of claim 13, wherein generating the user profile comprises generating a separate user profile for each different communication between the user and different interacting parties.

17. The computer program product of claim 14, wherein completing the action on behalf of a user comprises providing an answer to a query and providing the personality and behavior of the user when providing the answer based on the user profile.

* * * * *